June 21, 1966  D. B. PORTER ETAL  3,256,996

HIGH PRESSURE FILTER

Original Filed Sept. 28, 1960

INVENTORS
DAVID B. PORTER
RICHARD A. PAINE
BY
Kenway, Jenney & Hildreth

ATTORNEYS

United States Patent Office 3,256,996
Patented June 21, 1966

3,256,996
HIGH PRESSURE FILTER
David B. Porter, Watertown, and Richard A. Paine, Bedford, Mass., assignors to Millipore Filter Corporation, Bedford, Mass., a corporation of Massachusetts
Original application Sept. 28, 1960, Ser. No. 59,114. Divided and this application Apr. 30, 1963, Ser. No. 276,974
1 Claim. (Cl. 210—457)

This invention relates to high pressure filtration of fluids, and has as its primary object the provision of a highly permeable cartridge filter capable of filtering particles of micron size or smaller and of withstanding high filtration pressures. This application is a division of our co-pending application Serial Number 59,114, filed September 28, 1960, and entitled "Method of Applying a Microporous Plastic Membrane Filter on a Support," now Patent No. 3,198,865, issued August 3, 1965.

A filter capable of removing microscopic particles from a fluid under pressure and at high rates of flow is useful in many applications, such as oil or fuel filtering in aircraft. However, a filter which possesses both the requisites of a sufficiently large number of pores of micron size for filtration at a high rate of flow, and sufficient strength to withstand high pressure differentials has not heretofore been commonly available.

Materials having sufficiently small pores in such substantial numbers as to give an acceptable permeability are the flexible microporous plastic filter films of the type described by Zsigmondy in U.S. Patent 1,421,341; by P. Grabar and J. A. De Loureiro in Annales de l'Institute Pasteur, 65, 159–189 (1939); and by Lovell and Bush Patent Number 2,783,894. These materials are microporous plastics, having pores of effective diameter less than about ten microns in a number occupying more than 80 percent of the total volume of the plastic material.

These materials are not strong, however, and in order to support such plastic filter films against a substantial pressure differential exerted by a fluid being filtered, it is necessary to back-up the plastic film with a reinforcing material which is not only of adequate strength, but which will not unduly impair the filtering action of the film. Accordingly, the reinforcing material is desirably perforated with interstitial openings which are spanned by the filtering film. These openings or perforations should be of sufficient area to permit a maximum rate of filtration without being so large as to permit the spanning film to fail under the fluid pressure, by rupturing or cracking.

The present invention is based upon the discovery that a plastic filtering film which is disposed peripherally about a rigid tube of perforated or otherwise porous reinforcing material in a loosely overlying relationship receives adequate reinforcement from the tube, and yet is capable of filtering fluid over effectively its entire surface area. The term "loosely overlying" is used in the sense that the film does not adhere to the tube, although there may be mutual contact. The phenomenon is believed to occur through lateral flow in the minute space between the plastic filter film and the tube, so that portions of the film overlying solid areas of the tube pass fluid as well as those portions overlying perforations. By the use of this invention, it is possible to achieve filtration over substantially the entire area of the film when combined with a supporting tube having perforations covering only about 25 percent of the surface area of the tube. It is thus possible to achieve more effective reinforcement of the plastic film, with the result that the filter cartridge of the invention may be subjected to greater pressure differentials than have hitherto been feasible.

A preferred method of manufacture of the improved filter is disclosed and claimed by our aforementioned co-pending application.

In a filter cartridge according to the invention, a plurality of the filter tubes are assembled in parallel spaced-apart relation within an end cap at one end of the tubes and within a discharge conduit member at the opposite end of the tubes. A plastic resin potting compound is deposited about the exterior peripheries of the ends of the tubes to seal them against fluid communication within the end cap and the conduit member. Communication between the interior and exterior surfaces of the tubes is thus established only through the plastic filtering film. The assembly is adapted to be inserted within a pressure vessel to which a fluid to be filtered is supplied under a suitable pressure. The filtered fluid is withdrawn through the conduit member.

While the specification concludes with the claim particularly pointing out the subject matter of the invention, it is believed that the invention will be more clearly understood from the following detailed description of the preferred embodiments thereof, referring to the accompanying drawings, in which:

Figure 1:
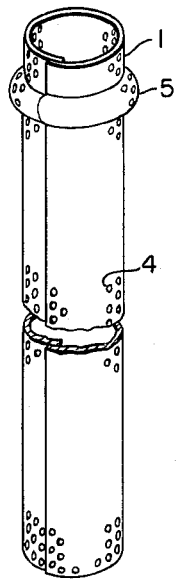
FIG. 1 is a pictorial view of a tube member forming one element of the filter.

The improved filter is formed over a rigid supporting tube 1 of metal or other relatively rigid material having the necessary strength. The tube may be rolled, as shown, from a previously perforated sheet, or the perforations 4 may be formed after the tube is formed. An enlarged flange 5 or similar configuration is conveniently provided near at least one end of the tube to facilitate subsequent sealing within a fluid discharge conduit member or a cap member. The perforations 4 are of sufficient transverse dimension to permit a maximum rate of flow into the interior of the tube from the filtering film while providing adequate support to prevent rupturing or cracking of the film, which overlies the perforations. Because of the utilization for filtering of substantially the full area of the plastic film which is achieved by the filter of this invention, the perforations 4 may occupy as little as about 25 percent of the surface area of the tube.

A thin flexible film of microporous plastic material 3 is deposited about the periphery of the tube to overlie those perforations 4 which lie along the portion of the tube below the flange 5. The plastic film should be at least 40 microns in thickness, to afford sufficient strength to prevent pressing of the subsequently formed solid film through the perforations 4 by fluid pressure applied in operation of the filter, and consequent rupture of the film. It is desirable to form a film of somewhat greater thickness than the minimum, preferably in the range of 100 to 140 microns.

The film is formed as a solid microporous structure, as described in the previously mentioned patent to Zsigmondy. The resulting filter may be capable of removing particles as small as $1/100,000$ mm., which corresponds to an effective pore size of about 10 millimicrons. Although this description is made with specific reference to the cellulose ester films of the type described by Zsigmondy, other solutions of film-forming materials and treatments for processing them into microporous solid structures, such as are well known in the art, may be used with entirely satisfactory results.

The film loosely overlies the tube, that is to say, it does not adhere to the tube, although it may not be readily removed and may be in surface contact with it. The resulting filter is utilized by supplying the fluid to be filtered under a substantial pressure to the exterior surface of the film 3, and providing conduit means to drain the filtered fluid from at least one of the ends of the tube 1. The filter has been found in practice to withstand fluid pressures up to at least 150 pounds per square inch.

Figure 3:
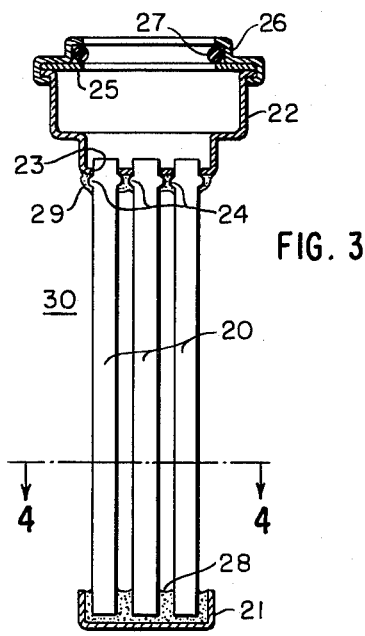
FIG. 3 is a sectional view in elevation of a filter cartridge assembly.
Figure 2:
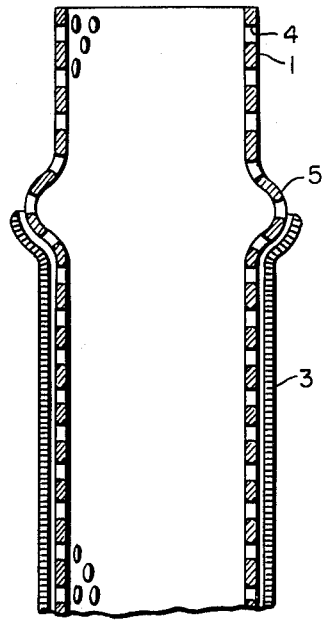
FIG. 2 is a fragmentary view in cross section of a completed filter.
Figure 4:
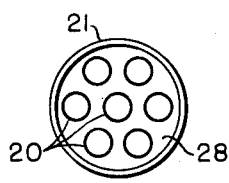
FIG. 4 is an end view of the assembly of FIG. 3.

A structure in which a plurality of the filters are utilized to form a filter cartridge is shown in FIGS. 3 and 4. The tubes are located in parallel spaced-apart relation within a cap member 21 at first ones of the ends thereof, and a discharge conduit member 22 at the other ends thereof. The tubes are received within a plurality of suitable spaced openings 23 formed in the member 22, against which the flanges 24 of the tubes abut. In the embodiment shown, the conduit member is provided with a disc element 25 and a flange element 26 retaining an O-ring seal 27, of rubber or other resilient material, for fluid-sealing engagement with a discharge tube (not shown). A mass of resin potting compound 28 is disposed within the cap 21 to receive the first ends of the tubes in fluid sealing engagement, and a further mass 29 of the same compound is applied about the flanges 24 and the openings 23 to seal the opposite ends of the tubes against direct fluid flow from the space 30 surrounding the tubes into the conduit member 22. The resin potting compound may be thermosetting or thermoplastic, but must be of a material which will not react with the plastic filter film of the cartridges.

The assembly is immersed in a suitable pressure vessel enclosing the space 30, to which fluid to be filtered is supplied under pressure. The fluid is filtered through the plastic films of the tubes 20, and is removed from the assembly through the discharge tube previously referred to (not shown). It has been found that an assembly of this kind utilizing thirty-one tubes each measuring approximately one-quarter of an inch in diameter by three and a half inches in length will filter twelve gallons per minute of water under a pressure differential of 40 pounds per square inch.

It will be apparent to those skilled in the art that various changes and modifications may be made in the method and product of the invention without departing from the spirit and scope thereof; all such changes and modifications are therefore intended to be covered in the appended claim.

What we claim and desire to secure by Letters Patent of the United States is:

A filter element comprising, in combination, a rigid tube having a plurality of perforations substantially uniformly distributed along the tube, and a continuous thin flexible microporous plastic film having substantially transverse pores of effective diameter less than 10 microns which in number occupy a volume in excess of 80 percent of said film, said perforations comprising about 25% of the area of the tube and each perforation having a transverse dimension which permits a maximum flow of fluid from the plastic film while providing adequate support for the plastic film, said plastic film having a thickness in the range of 40 to 140 microns and loosely overlying the outer periphery of said tube and said perforations, whereby the film does not adhere to the tube and there is a lateral flow of fluid in the space between the plastic film and the tube providing filtration over substantially the entire plastic film area, and whereby said tube is effective to maintain the normal form of said film against an external fluid filtration pressure while permitting free filtration of fluid over substantially the entire surface area of said film.

References Cited by the Examiner

UNITED STATES PATENTS

| 666,044 | 1/1901 | Barr | 210—323 X |
| 1,421,341 | 6/1922 | Zsigmondy et al. | 210—321 X |
| 2,440,487 | 4/1948 | Rayburn | 210—323 X |
| 2,783,894 | 3/1957 | Lovell et al. | 210—500 |

FOREIGN PATENTS

| 5,995 | 1898 | Great Britain. |

REUBEN FRIEDMAN, *Primary Examiner.*

S. ZAHARNA, *Assistant Examiner.*